United States Patent
Chan

(10) Patent No.: US 11,070,152 B2
(45) Date of Patent: Jul. 20, 2021

(54) OPTICAL DRIVING MECHANISM

(71) Applicant: TDK TAIWAN CORP., Yangmei Taoyuan (TW)

(72) Inventor: Yi-Liang Chan, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 148 days.

(21) Appl. No.: 15/840,288

(22) Filed: Dec. 13, 2017

(65) Prior Publication Data

US 2018/0175758 A1    Jun. 21, 2018

Related U.S. Application Data

(60) Provisional application No. 62/437,247, filed on Dec. 21, 2016.

(30) Foreign Application Priority Data

Oct. 27, 2017    (CN) .......................... 201711020082.6

(51) Int. Cl.
*G02B 27/64* (2006.01)
*H02P 7/025* (2016.01)
(Continued)

(52) U.S. Cl.
CPC ................ *H02P 7/025* (2016.02); *G02B 7/09* (2013.01); *G02B 27/646* (2013.01);
(Continued)

(58) Field of Classification Search
CPC . H02P 7/025; H02P 2203/11; H02K 41/0356; H02K 11/225; G02B 27/646;
(Continued)

(56) References Cited

U.S. PATENT DOCUMENTS

2008/0259470 A1* 10/2008 Chung ................ G02B 7/08
                                                              359/823
2011/0205647 A1*  8/2011 Osaka ................ F16F 1/021
                                                              359/824

(Continued)

FOREIGN PATENT DOCUMENTS

CN    102162897 A    8/2011
CN    105980922 A    9/2016

OTHER PUBLICATIONS

Chinese Office Action dated May 6, 2020 for corresponding Application No. 201711020082.6, 4 pages.

*Primary Examiner* — Mustak Choudhury
(74) *Attorney, Agent, or Firm* — Muncy, Geissler, Olds and Lowe, P.C.

(57) ABSTRACT

An optical driving mechanism is provided, disposed in an electronic device, including a movable portion, a fixed portion, and a sensing assembly. The movable portion has a holder configured to sustain an optical element. The fixed portion is affixed in the electronic element and connects to the movable portion, wherein the movable portion is movable relative to the fixed portion by applying a magnetic force. The sensing assembly has a coil and a magnetic element configured to sense the relative positions of the movable portion and the fixed portion.

13 Claims, 9 Drawing Sheets

(51) Int. Cl.
*H02K 41/035* (2006.01)
*H02K 11/225* (2016.01)
*G02B 7/09* (2021.01)

(52) U.S. Cl.
CPC ....... *H02K 11/225* (2016.01); *H02K 41/0356* (2013.01); *H02P 2203/11* (2013.01)

(58) Field of Classification Search
CPC . G02B 7/025; G02B 7/08; G02B 7/09; G02B 13/36; G02B 7/021; G02B 7/02; G02B 7/28; G02B 7/102; G02B 27/64; G02B 5/02; G02B 3/10; H04N 5/2254; H04N 5/2257; H04N 5/23264; H04N 5/23287; H04N 5/23296; F16F 1/021; F16F 1/027
USPC ............ 359/557, 823, 824; 348/208.11, 335; 267/158, 161
See application file for complete search history.

(56) References Cited

U.S. PATENT DOCUMENTS

| | | | |
|---|---|---|---|
| 2012/0154614 A1* | 6/2012 | Moriya | G03B 3/10 |
| | | | 348/208.5 |
| 2012/0300322 A1* | 11/2012 | Takashima | H02K 41/0356 |
| | | | 359/824 |
| 2014/0177056 A1* | 6/2014 | Hayashi | G02B 7/08 |
| | | | 359/557 |
| 2016/0116703 A1* | 4/2016 | Cheng | G02B 7/08 |
| | | | 359/557 |
| 2016/0209618 A1* | 7/2016 | Avivi | G03B 3/10 |
| 2016/0258736 A1* | 9/2016 | Bachar | G01B 7/003 |
| 2016/0363462 A1* | 12/2016 | English | G01D 5/145 |

\* cited by examiner

OPTICAL DRIVING MECHANISM

CROSS REFERENCE TO RELATED APPLICATIONS

This application claims the benefit of U.S. Provisional Application No. 62/437,247, filed on Dec. 21, 2016, and China Patent Application No. 201711020082.6 filed on Oct. 27, 2017 the entirety of which is incorporated by reference herein.

BACKGROUND OF THE INVENTION

Field of the Invention

The application relates in general to an optical driving mechanism, and in particular to an optical driving mechanism through the coil and the magnetic element to sense the relative positions of the movable portion and the fixed portion.

Description of the Related Art

Thanks to ongoing technological development, the most recent electronic devices (such as tablet computers and smartphones) being put on the market are increasingly trending toward miniaturization, and they usually include a lens module capable of aiding in photography or recording video. The demands on these increasingly indispensable electronic devices are also rapidly growing. However, an image may come out blurry if the user shakes the lens module in the electronic device. To miniaturize the electronic device and improve image quality, it is increasingly important to design a smaller and effectively shockproof lens module.

BRIEF SUMMARY OF INVENTION

To address the deficiencies of conventional products, an embodiment of the invention provides an optical driving mechanism disposed in an electronic device, including a movable portion, a fixed portion, and a sensing assembly. The movable portion has a holder configured to sustain an optical element. The fixed portion is affixed in the electronic element and connects to the movable portion, wherein the movable portion is movable with respect to the fixed portion by applying a magnetic force. The sensing assembly has a coil and a magnetic element configured to sense the relative positions of the movable portion and the fixed portion.

In some embodiments, an alternating current with a fixed frequency is applied to the sensing assembly to sense the relative positions of the movable portion and the fixed portion.

In some embodiments, the relative positions of the movable portion and the fixed portion are sensed by measuring variations in the inductance value of the coil.

In some embodiments, the winding direction of the coil is parallel to the magnetic pole direction of the magnetic element.

In some embodiments, the sensing assembly is configured to force the movable portion to move relative to the fixed portion.

In some embodiments, when a direct current is applied to the sensing assembly, the sensing assembly forces the movable portion to move relative to the fixed portion, and when an alternating current with a fixed frequency is applied to the sensing assembly, the sensing assembly senses the relative positions of the movable portion and the fixed portion.

In some embodiments, the optical driving mechanism further comprises a driving assembly configured to sense the relative positions of the movable portion and the fixed portion.

In some embodiments, the sensing portion has a plurality of magnetic elements corresponding to the coil.

In some embodiments, the magnetic element has a plurality of magnetic poles.

In some embodiments, the sensing assembly has a plurality of coils corresponding to the magnetic element.

In some embodiments, the coils are respectively surrounding a first central axis and a second central axis, and the first central axis and the second central axis are not parallel.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical driving mechanisms are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted by an idealized or overly formal manner unless defined otherwise.

Figure 1:
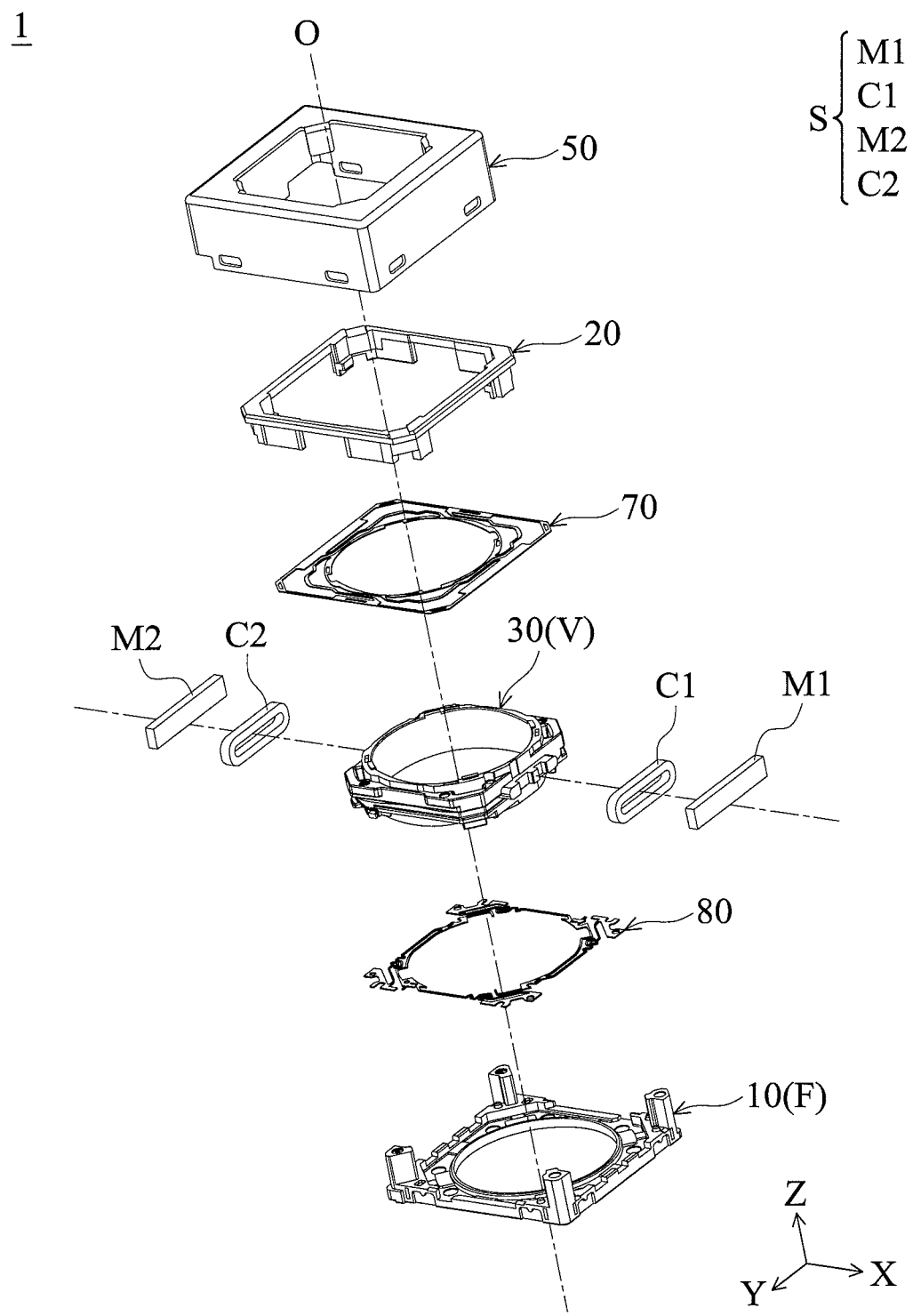
FIG. 1 is an exploded diagram of an optical driving mechanism according to an embodiment of the invention.

FIG. 1 is an exploded-view diagram of an optical driving mechanism 1 according to an embodiment of the invention. The optical driving mechanism 1 can be disposed in an electronic device, such as a camera, a tablet computer, or a cell phone, and it can sustain an optical element (such as an optical lens; not shown) and force the optical element to move relative to an image sensor disposed the electronic device, so that the optical driving mechanism 1 has functions of auto-focusing (AF) function and optical image stabilization (OIS), to enhance image quality.

As shown in FIG. 1, the optical driving mechanism 1 primarily comprises a housing, a frame 20, a fixed portion F, a movable portion V, and a sensing assembly S. The fixed portion F is affixed within the electronic device and includes a base 10. The frame 20 is affixed to the base 10. The base 10, frame 20, movable portion V, and the sensing assembly S are disposed in the housing 50 which is configured to protect them. The movable portion V includes a holder 30 which can sustain an optical element, wherein an image sensor (not shown) of the electronic device is configured to receive light from the outside of the electronic device and through the optical element (from the direction of the optical axis O of the optical element), so that an image is acquired.

Figure 2:
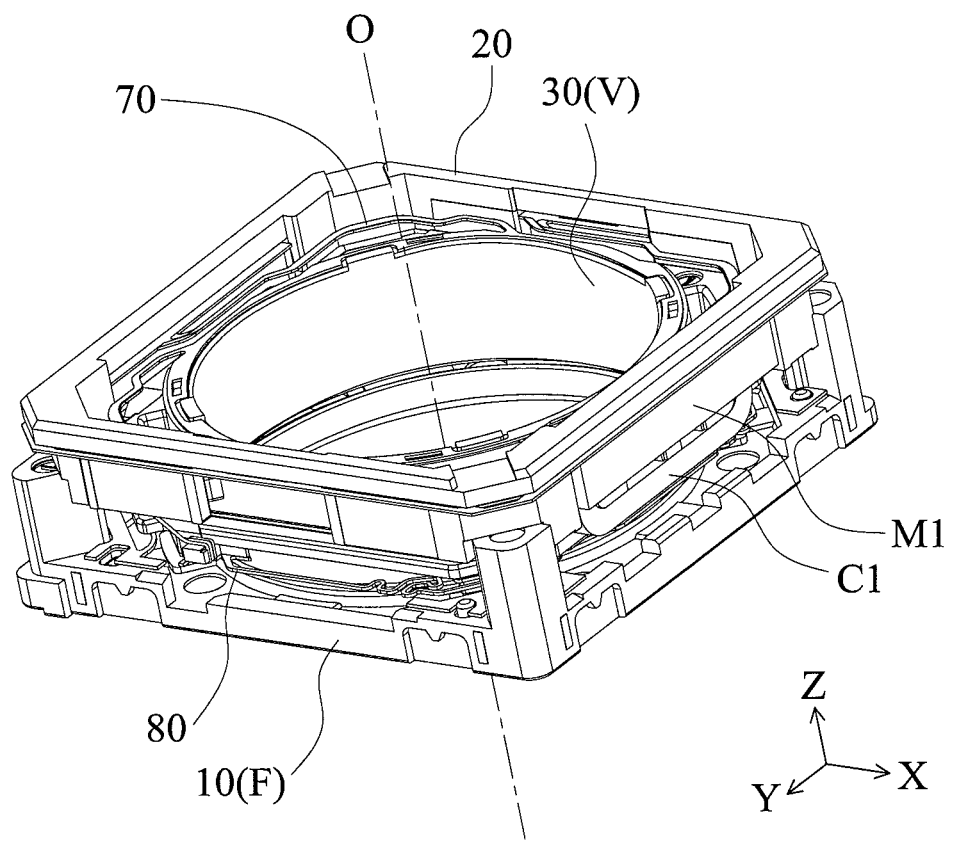
FIG. 2 is a schematic diagram of the optical driving mechanism in FIG. 1 after assembly (the housing 50 is omitted).

Please refer to FIGS. 1 and 2, wherein FIG. 2 is a schematic diagram of the optical driving mechanism 1 in FIG. 1 after assembly (the housing 50 is omitted). The frame 20 is disposed on the base 10 of the fixed portion F. The holder 30 of the movable portion V is disposed on the base 10 and is connected to the base 10 and the frame 20 via a first leaf spring 70 and a second leaf spring 80 (such as springs with a sheet-shape) of the optical driving mechanism 1, so as the movable portion V is movably connected to the fixed portion F. The sensing assembly S is disposed outside the holder 30 and can be disposed on the holder 30 and the first leaf spring 70. The sensing assembly S will be described in detail below.

As shown in FIG. 2, the sensing assembly S includes a plurality of coils C1 and C2 and a plurality of magnetic elements (e.g., magnets) M1 and M2 corresponding to each other, respectively disposed on a side of the holder 30 and the lower surface of the first leaf spring 70. The coils C1 and C2 can receive a signal (for example, a current for driving or sensing, such as a first input signal, a first driving signal, a second input signal, a second driving signal) supplied by an external power source (not shown), thereby a magnetic force is generated with the magnetic elements M1 and M2 so that the sensing element S can force (drive) the holder 30 and the optical element disposed therein (the movable part V) to move along the direction of the optical axis O (Z axis) of the optical element together relative to the fixed portion F, so as to achieve the auto-focus function, or when the optical lens is shaken, a good compensation effect can be obtained by the foregoing moving mechanism. In addition, before the driving signal is applied, the first and second leaf springs 70 and 80 can keep the holder 30 in an initial position relative to the fixed portion F.

In this embodiment, the coils C1 and C2 can be electrically connected through the plurality of conductive wires (not shown) and the coils C1 and C2 also can be connected to the holder 30 via the conductive wires. Furthermore, another plurality of wires (not shown) may be formed on the base 10, the frame 20 and the holder 30 by insert molding or 3D molded interconnect device (MID) technology, so that the sensing assembly S (including the coils C1 and C2 and the magnetic elements M1 and M2) can be electrically connected to an external power supply through those wires to receive the driving signal so as to move the movable portion V relative to the fixed portion F. Since the wires are formed on the base 10 in a manner of insert molding or insert molding or 3D molded interconnect device technology, the need for additional wires can be eliminated to reduce the overall number of parts in the optical driving mechanism 1 and greatly reduce the volume thereof.

Figure 3:
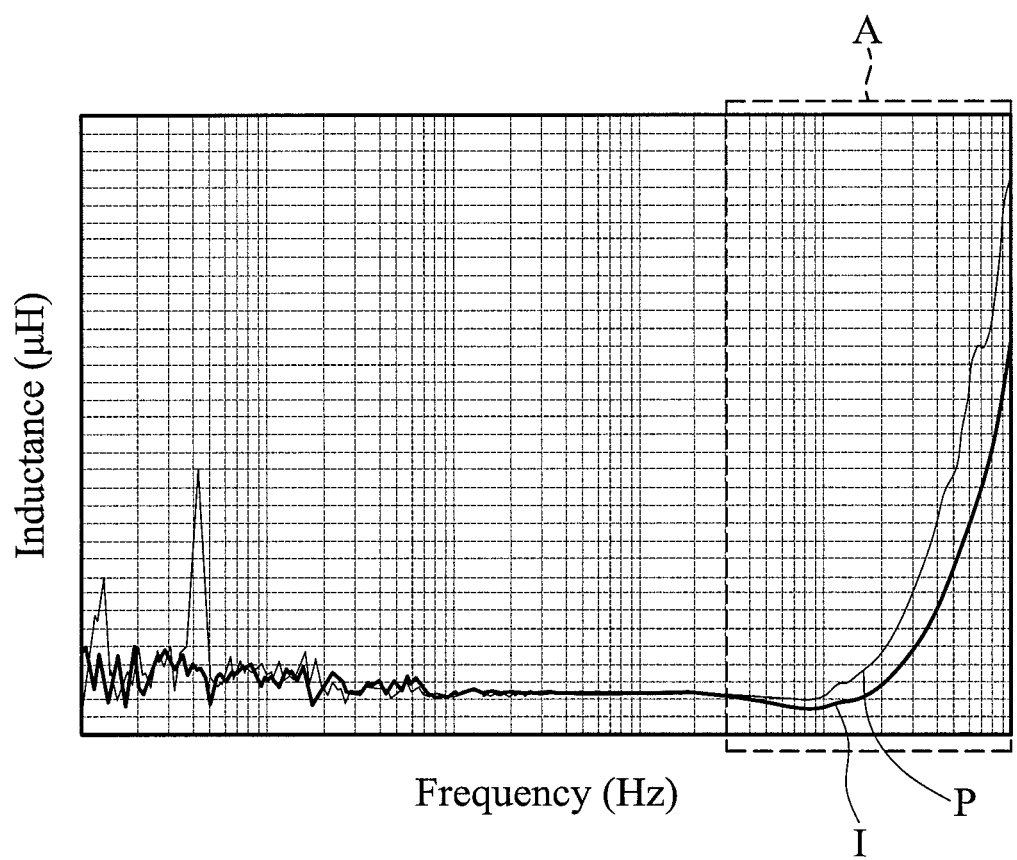
FIG. 3 is a schematic diagram of the inductance value of a coil in an initial position and a predetermined position at different frequencies.

It should be noticed that the sensing assembly S is further used for sensing the relative moving position of the movable portion V (the holder 30) relative to the fixed portion F (the base 10). Specifically, each of the coils C1 and C2 in the optical driving mechanism 1 has an inductance value, and these inductance values change due to the different current frequency input thereto (for example, input by an external power source) and variations of magnetic flux passing through the coils. As shown in FIG. 3, the horizontal axis represents the current frequency input to the coil, and the vertical axis represents the inductance value of the coil. It can be observed that when the input current frequency is at a specific frequency (for example, the parasitic capacitance value of the coil between it starting to change and the harmonic resonance frequency) range (as shown FIG. 3; the area A) and when the relative positions of the coil and the magnetic element are different (that is, a relative movement between the coil and the magnetic element; one of them moving from an initial position to a predetermined position), the inductance value changes significantly (as shown in FIG. 3, the inductance values in the initial position I and the predetermined position P). In this way, the relative positions of the coil and the magnetic element are sensed through the input of a constant (fixed) frequency current (such as an alternating current (AC)) and measuring variations in the inductance value of the coil, thereby determining the relative positions of the coil and the magnetic element. Therefore, one or more other position sensing elements can be omitted from the optical driving mechanism 1 to achieve miniaturization.

Figure 4A:
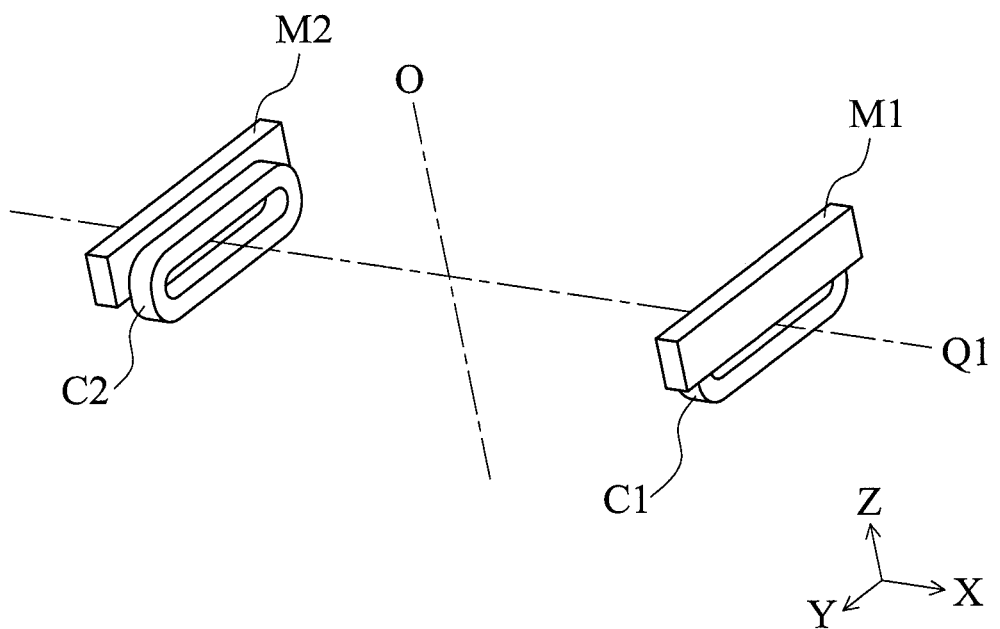
FIG. 4A is a schematic diagram of the arrangement of the coils C1 and C2 and the magnetic elements M1 and M2.
Figure 4B:
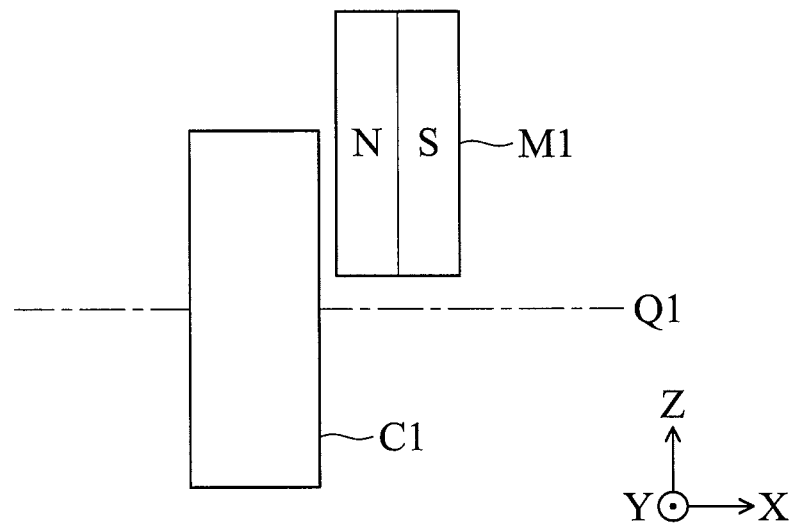
FIGS. 4B to 4C is a schematic diagram showing the coil C1 moving from an initial position to a predetermined position relative to the magnetic element M1.
Figure 4C:
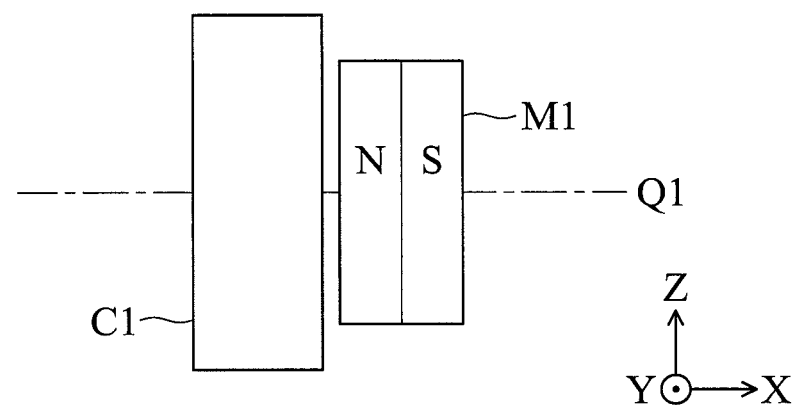

FIG. 4A is a schematic diagram showing the arrangement of the aforementioned coils C1 and C2 and the magnetic elements M1 and M2. FIGS. 4B to 4C are schematic diagrams illustrating the coil C1 and the magnetic element M1 of FIG. 4A, wherein the coil C1 moves relative to the magnetic element M1 from an initial position (FIG. 4B) to a predetermined position (FIG. 4C).

When a driving signal (for example, a direct current (DC)) is applied to the coil C1 by an external power source, a magnetic force is generated between the coil C1 and the magnetic element M1 and they relatively move. The magnetic flux passing through the coil C1 is changed, and the inductance value of the coil C1 is also changed. By measuring the change of the inductance value (for example, through an integrated circuit to measure), the relative positions of the current coil C1 and the magnetic element M1 can be obtained. Therefore, the position of the movable portion V (the coil C1 is disposed on the holder 30) relative to the fixed portion F (the magnetic element M1 is disposed on the frame 20, and the frame 20 is affixed to the base 10) can be sensed so that the optical driving mechanism 1 has good auto-focus or shake compensation. The relative positions of the coil C2 and the magnetic element M2 (disposed on the other side of the holder 30) can also be sensed by measuring changes in the inductance value caused by changes in the magnetic flux passing through the coil C2 due to the movement. In other words, driving the movable portion V and sensing the position of the movable portion V with respect to the fixed portion F can be achieved by the driving current (direct current) and the sensing current (alternating current) being input to the coil C1 (or C2) via the external power source. In an embodiment, the external power source may input the driving current (direct current) and the sensing current (alternating current) to the coil C1 (or C2) simultaneously.

In this embodiment, the magnetic pole directions of the magnetic elements M1 and M2 (corresponding to the coils C1 and C2) are parallel to the winding direction of the coil C1 (or C2). Specifically, referring to FIGS. 4A and 4B, the coils C1 and C2 surround a first central axis Q1, and the winding directions thereof are parallel to the first central axis Q1. The magnetic poles of the magnetic elements M1 and M2 are also parallel to the first central axis Q1. As a result, the magnetic flux passing through the coils C1 and C2 can be increased by the above-mentioned arrangement so that the magnetic flux changes more significantly when the coils C1 and C2 move relative to the magnetic elements M1 and M2 (moving from the initial position to the predetermined position), so as to further improve the accuracy of determining the relative movement of the fixed portion F and the movable portion V. In addition, in the present embodiment, the first central axis Q1 is substantially perpendicular to the optical axis O.

Figure 5:
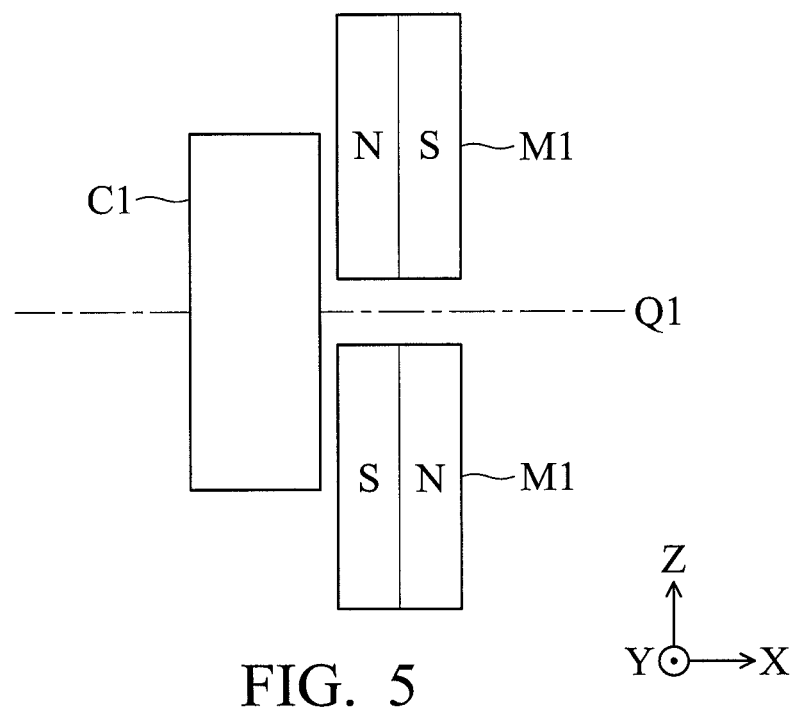
FIG. 5 is a schematic diagram of the magnetic element corresponding to the coil according to another embodiment of the invention.
Figure 6:
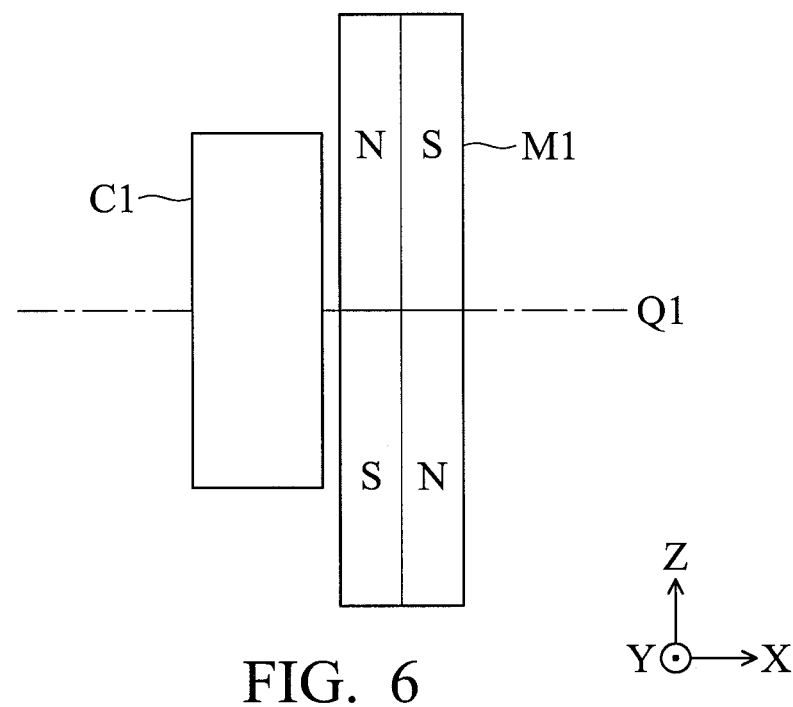
FIG. 6 is a schematic diagram of the magnetic element corresponding to the coil according to another embodiment of the invention.

In some embodiments, the coil C1 (or C2) may correspond to a plurality of magnetic elements M1 (or M2). As shown in FIG. 5, the two magnetic elements M1 are arranged along the Z axis and are corresponding to the coil C1. The two magnetic poles are opposite each other and a gap is formed between the two magnetic elements M1. One coil corresponds to a plurality of magnetic elements, which increases the magnetic force of the sensing portion S driving the movable portion V to move relative to the fixed portion F, and improves sensor accuracy. In another embodiment, the coil C1 corresponds to a magnetic element M1 having a plurality of magnetic poles (for example, four magnetic poles), as shown in FIG. 6, a similar effect can be achieved.

In some embodiments, the coils C1 and C2 are electrically independent of each other, and an external power source may individually apply individual driving signals to the coils C1 and C2. When the optical driving mechanism 1 is subjected to external impact, the external power source can input different driving currents (e.g., different current values) to the coils C1 and C2, respectively, so that different distances of displacement are generated (for the coils C1 and C2) to drive the movable portion V to rotate (relative to the fixed portion F) to achieve the effect of tilt correction. In addition, the individual positions can be sensed via the sensing currents input to the coils C1 and C2 to calculate the tilt angle, thereby improving the control and compensation accuracy. In another embodiment, four coils are disposed on the movable portion V. For example, those coils may be disposed around the holder 30 of the movable portion V, and an external power source can independently apply currents to the coils. By the suitable independent current(s) being applied, the movable portion V can perform the movement in the direction of the optical axis O with respect to the fixed portion F, the movement in the direction perpendicular to the optical axis O with respect to the fixed portion F, and the inclination with respect to the fixed portion F.

It should be noted that in another embodiment, the coils C1 and C2 and the magnetic elements M1 and M2 in the sensing assembly S can be redefined. The coil C1 and the magnetic element M1 are defined as a sensing assembly used for sensing the relative positions of the movable portion V and the fixed portion F (the movable portion V moves relative to the fixed portion F); the coil C2 and the magnetic element M2 are defined as a driving assembly used for forcing the movable portion V to move relative to the fixed portion F.

Figure 7:
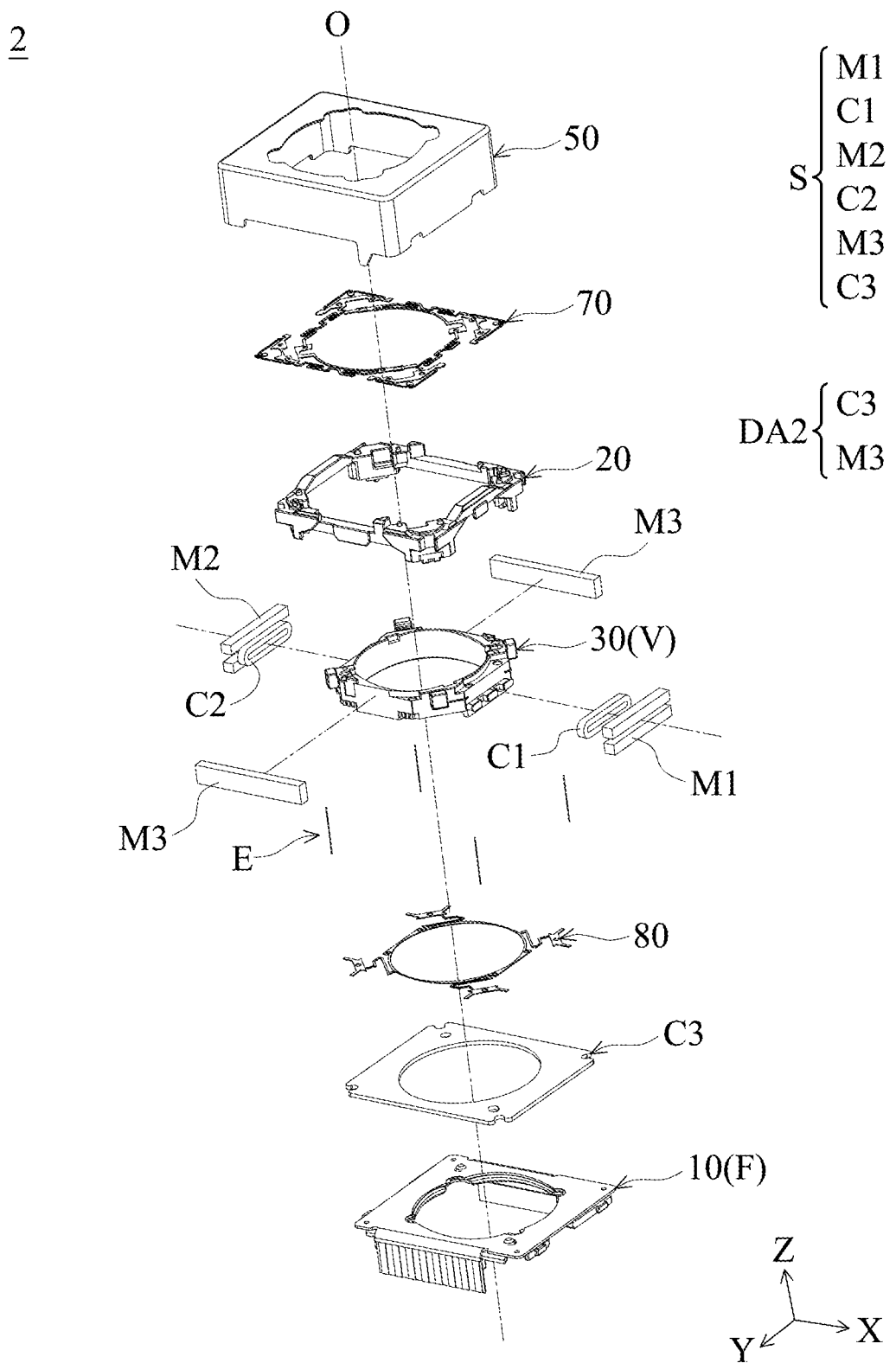
FIG. 7 is a schematic diagram of an optical driving mechanism according to another embodiment of the invention.
Figure 8:
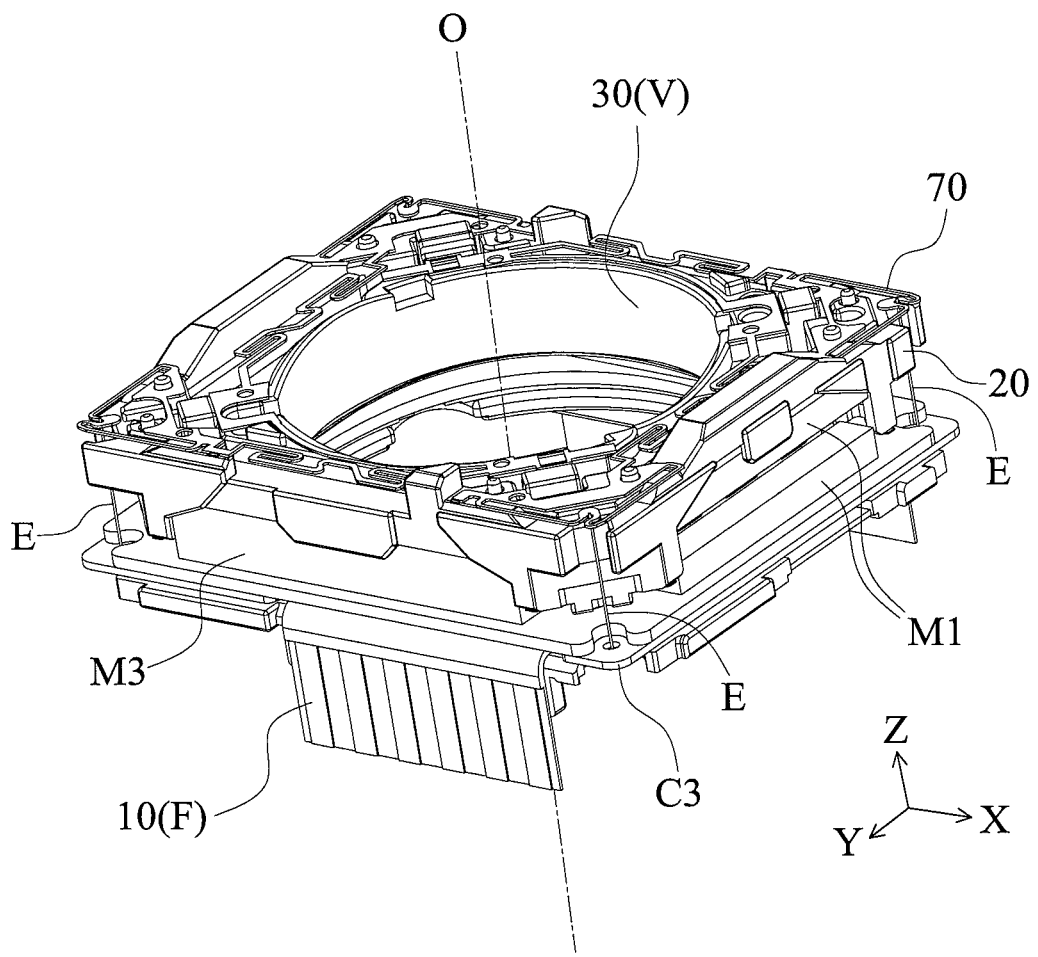
FIG. 8 is a schematic diagram of the optical driving mechanism in FIG. 7 after assembly (the housing 50 is omitted).

FIGS. 7 and 8 are schematic diagrams showing an optical driving mechanism 2 according to another embodiment of the present invention. The optical driving mechanism 2 primarily comprises a housing 50, a frame 20, a fixed portion F, a movable portion V and a sensing assembly S. The fixed portion F includes a bottom plate 10 affixed in an electronic device. The housing 50 is disposed on the bottom plate 10 and is configured to protect the movable portion V and the fixed portion F. The movable portion V has a holder 30, wherein the holder 30 is movably connected to the frame 20 through the upper and lower leaf springs 70 and 80 and can sustain an optical element. Images can be obtained by an image sensor (not shown; e.g., may be disposed on the bottom plate 10) in the electronic device to receive light from the outside and through the optical element. A plurality of elastic members E (such as elastic lines) are connected to the bottom plate 10 and the upper spring 70 of the fixed portion F, so that the movable portion V is movably connected to the fixed portion F.

The sensing assembly S includes two magnetic elements M1 (arranged on the same side), two magnetic elements M2 (arranged on the same side) (in another embodiment, only one magnetic element M1 and one magnetic element M2 may be included) and two magnetic elements M3 (arranged on different sides). These magnetic elements (M1, M2 and M3) surround the holder 30. The sensing assembly S further includes coils C1, C2 and C3 corresponding to the magnetic elements M1, M2 and M3, wherein the coil C3 is, for example, a flat coil and is affixed on the bottom plate 10. Please note that, the magnetic element M3 and the coil C3 may form a second driving assembly DA2. It should be noted that the coils C1 and C2 surround a first central axis Q1 (parallel to the winding directions of the coils C1 and C2) and the coil C3 surrounds a second central axis Q2 (parallel to the winding direction of the coil C3). Both of which are not parallel to each other. In the present embodiment, the first and second central axes Q1 and Q2 are substantially perpendicular to each other.

The main difference between the optical driving mechanism 2 and the aforementioned optical driving mechanism 1 (FIGS. 1 and 2) is that the sensing assembly S of the optical driving mechanism 2 includes not only the coils C1 and C2 but also the coil C3 disposed under the magnetic elements M1, M2 and M3. By applying a driving signal to the coil C3 to generate magnetic forces between the coil C3 and magnetic elements M1, M2 and M3 so as to drive the movable portion V (including the holder 30) relative to the fixed part F to move in a plane that is perpendicular to the optical axis O (XY plane) or angled (inclined) relative to the fixed portion F (i.e., the movable portion V rotates). Therefore, the optical driving mechanism 2 has a mechanism for moving or rotating the movable portion V in a plurality of different directions with respect to the fixed part F with good optical shake compensation.

Figure 9:
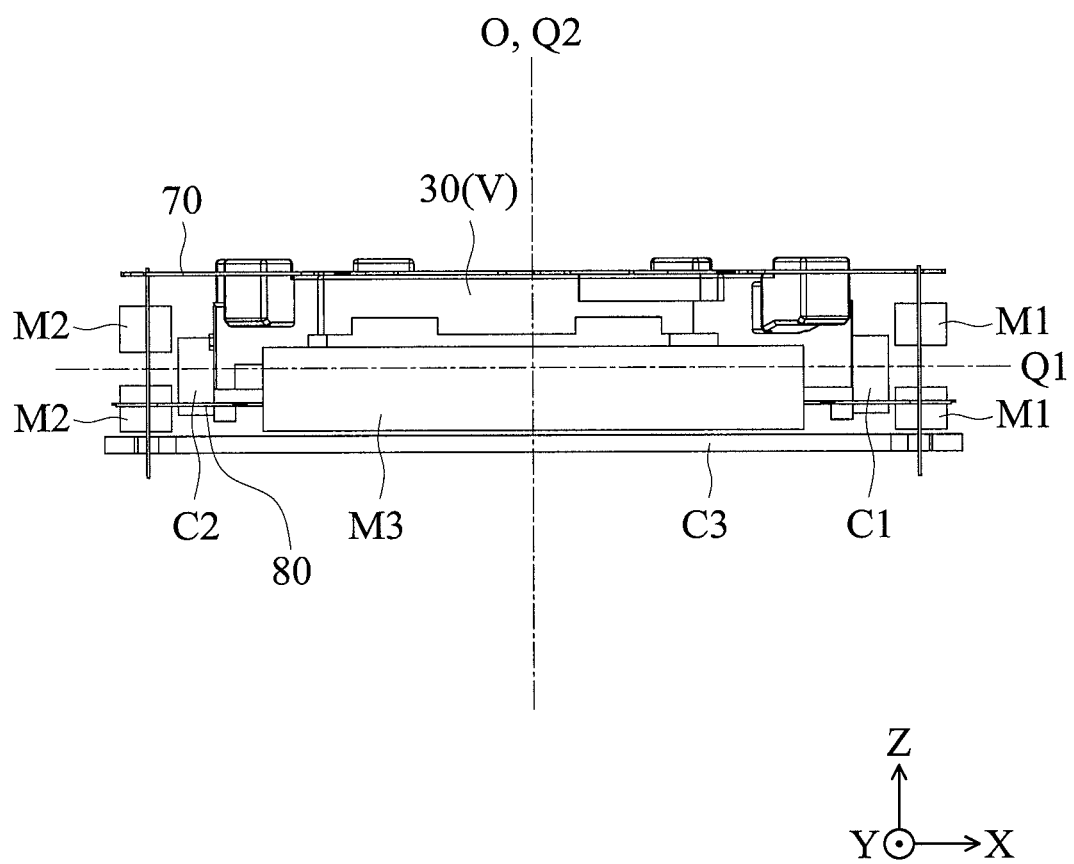
FIG. 9 is a side view diagram of the optical driving mechanism in FIG. 8 (the housing 50, the bottom plate 10 and the frame 20 are omitted).

FIG. 9 shows a side view of the optical driving mechanism 2 (the housing 50, the bottom plate 10 and the frame 20 are omitted to clearly show the arrangement of the respective coils and the magnetic elements). In this embodiment, the relative positions of the movable portion V and the fixed portion F can be sensed by the coil C3 and the magnetic elements M1, M2, and M3. Similar to the sensing method of the coil C1 and the magnetic element M1 in the previous embodiment (FIGS. 4B and 4C), by measuring variations in the inductance value of the coil C3 (when there is a relative displacement between the coil C3 and the magnetic element M3 (or/and M1 and M2), the inductance value of the coil C3 will be changed), the relative positions of the coil C3 and the magnetic element M3 (or/and M1, M2) are determined, so that the relative positions of the movable portion V and the fixed portion F can also be determined.

In addition, it should be noted that in the present embodiment, the magnetic element M1 (or M2) located on the lower side may correspond to the coil C1 (or C2) located on the lateral side and the coil C3 located therebelow. In other words, the magnetic element M1 (or M2) on the lower side may be a shared magnetic element (that is, one magnetic element corresponds to a plurality of coils), so no additional magnetic element is needed to correspond to the coil C3 to reduce the overall size of the optical driving mechanism 2. Thus, the product can be miniaturized.

In summary, an optical driving mechanism is provided, disposed in an electronic device, mainly including a movable portion, a fixed portion, and a sensing assembly. The movable portion has a holder configured to sustain an optical element. The fixed portion is affixed in the electronic element and connects to the movable portion, wherein the movable portion is movable with respect to the fixed portion by applying a magnetic force. The sensing assembly has a coil and a magnetic element configured to sense the relative positions of the movable portion and the fixed portion. Therefore, by using the coil and the magnetic element as a sensing assembly for sensing the relative positions of the movable portion and the fixed portion, an additional sensing element can be omitted and the overall size of the optical driving mechanism can be reduced. Moreover, the arrangement of the coil and the magnetic element is no longer restricted or limited by the additional sensing element causing the magnetic force being decreased. In addition, the overall circuit structure can be simplified to reduce the electromagnetic interference between elements and to simplify the manufacturing process.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. An optical driving mechanism, comprising: a movable portion, configured to connect an optical element; a fixed portion, wherein the movable portion is movable relative to the fixed portion; a first driving assembly, configured to drive the movable portion to move relative to the fixed portion, including: a first magnetic element; and a first coil, corresponding to the first magnetic element; and a control assembly, configured to control the first driving assembly, wherein the control assembly outputs: a first driving signal, which is input to the first coil, configured to drive the movable portion to move relative to the fixed portion; and a first input signal, wherein the first input signal and the first driving signal are simultaneously input to the first coil, the first coil receives the first input signal and outputs a first output signal to the control assembly, after the control assembly receives the first output signal, movement information of the movable portion relative to the fixed portion can be obtained, and the first output signal changes according to the relative position of the first coil and the first magnetic element; wherein the optical driving mechanism does not directly or indirectly use a magnetic sensor or an optical sensor when sensing the movement of the movable portion relative to the fixed portion; wherein the optical driving mechanism does not use additional coils to sense the first coil when sensing the movement of the movable portion relative to the fixed portion, wherein movement information of the movable portion is related to the movement of the first coil from an initial position to a predetermined position relative to the first magnetic element.

2. The optical driving mechanism as claimed in claim 1, wherein an alternating current with a fixed frequency is applied to the first driving assembly to sense the relative positions of the movable portion and the fixed portion.

3. The optical driving mechanism as claimed in claim 2, wherein the relative positions of the movable portion and the fixed portion are sensed by measuring variations in the inductance value of the first coil.

4. The optical driving mechanism as claimed in claim 1, wherein the winding direction of the first coil is parallel to the magnetic pole direction of the first magnetic element.

5. The optical driving mechanism as claimed in claim 1, wherein the first driving assembly is configured to force the movable portion to move relative to the fixed portion.

6. The optical driving mechanism as claimed in claim 5, wherein when a direct current is applied to the first driving assembly, the first driving assembly forces the movable portion to move relative to the fixed portion, and when an alternating current with a fixed frequency is applied to the first driving assembly, the first driving assembly senses the relative positions of the movable portion and the fixed portion.

7. The optical driving mechanism as claimed in claim 1, further comprising a second driving assembly configured to sense the relative positions of the movable portion and the fixed portion.

8. The optical driving mechanism as claimed in claim 1, wherein the first driving assembly has a plurality of first magnetic elements corresponding to the first coil.

9. The optical driving mechanism as claimed in claim 1, wherein the first magnetic element has a plurality of magnetic poles.

10. The optical driving mechanism as claimed in claim 1, wherein the first driving assembly has a plurality of first coils corresponding to the first magnetic element.

11. The optical driving mechanism as claimed in claim 10, wherein the first coils are respectively surrounding a first central axis and a second central axis, and the first central axis and the second central axis are not parallel.

12. The optical driving mechanism as claimed in claim 1, further comprising:
a second driving assembly, configured to drive the movable portion to move relative to the fixed portion, wherein the second driving assembly includes:
a second magnetic element; and
a second coil, corresponding to the second magnetic element;
wherein the control assembly is configured to control the second driving assembly and outputs:

a second driving signal, which is input to the second coil, configured to drive the movable portion to move relative to the fixed portion; and a second input signal, wherein the second input signal and the second driving signal are simultaneously input to the second coil, the second coil receives the second input signal and outputs a second output signal to the control assembly, after the control assembly receives the second output signal, the movement information of the movable portion relative to the fixed portion can be obtained, and the second output signal changes according to the relative position of the first coil and the first magnetic element;

wherein when the optical driving mechanism senses the movement of the movable portion relative to the fixed portion, no additional coil is used to sense the second coil;

wherein the control assembly controls the first and second driving assemblies to drive the movable portion to rotate relative to the fixed portion, so as to correct the tilt of an optical axis of the optical element or to cause the optical axis to tilt.

13. An optical driving mechanism, comprising: a movable portion, configured to connect to an optical element; a fixed portion, wherein the movable portion is movable relative to the fixed portion; a driving assembly, configured to drive the movable portion to move relative to the fixed portion, including: a first magnetic element; and a first coil, corresponding to the first magnetic element; a sensing assembly, configured to sense the movement of the movable portion relative to the fixed portion, wherein the sensing assembly includes: a second magnetic element; and a second coil, corresponding to the second magnetic element; and a control assembly, controlling the driving assembly via the sensing assembly, wherein the control assembly outputs: a driving signal, which is input to the first coil, configured to drive the movable portion to move relative to the fixed portion; and an input signal, which is input to the second coil, wherein the second coil receives the input signal and outputs an output signal to the control assembly, after the control assembly receives the output signal, movement information of the movable portion relative to the fixed portion can be obtained, and the output signal changes according to the relative position of the first coil and the first magnetic element; wherein the optical driving mechanism does not directly or indirectly use a magnetic sensor or an optical sensor when sensing the movement of the movable portion relative to the fixed portion; wherein the optical driving mechanism does not use additional coils to sense the second coil when sensing the movement of the movable portion relative to the fixed portion, wherein movement information of the movable portion is related to the movement of the first coil from an initial position to a predetermined position relative to the first magnetic element.

* * * * *